United States Patent [19]
Spiegelberg et al.

[11] Patent Number: 5,814,421
[45] Date of Patent: Sep. 29, 1998

[54] METHOD AND APPARATUS FOR MAKING A BATTERY TERMINAL AND A BATTERY TERMINAL MADE THEREBY

[75] Inventors: Bernard N. Spiegelberg, Germantown; Mark E. Sauter, Shorewood, both of Wis.

[73] Assignee: Tulip Corporation, Milwaukee, Wis.

[21] Appl. No.: 771,282

[22] Filed: Dec. 20, 1996

[51] Int. Cl.[6] ........................................ H01M 2/30
[52] U.S. Cl. ........................ 429/178; 429/180; 429/181
[58] Field of Search ................................ 429/178, 179, 429/180, 181; 29/874

[56] References Cited

U.S. PATENT DOCUMENTS

| | | |
|---|---|---|
| 3,381,515 | 5/1968 | Orloff . |
| 4,304,827 | 12/1981 | Clingerpeel . |
| 4,394,692 | 7/1983 | Randmae et al. ................ 358/229 |
| 4,424,854 | 1/1984 | Tiegel . |
| 4,729,934 | 3/1988 | Krystaszek . |
| 4,776,197 | 10/1988 | Scott . |
| 4,898,796 | 2/1990 | Furukawa .......................... 429/172 |
| 5,296,317 | 3/1994 | Ratte et al. ........................ 429/181 |
| 5,349,840 | 9/1994 | Ratte et al. . |
| 5,422,202 | 6/1995 | Spielberg et al. ................ 429/179 |
| 5,425,170 | 6/1995 | Spielberg et al. ................ 29/874 |
| 5,589,294 | 12/1996 | Spielberg et al. ................ 429/178 |

OTHER PUBLICATIONS

Taumel, Orbital Headforming, 1992 (Month N/A).

*Primary Examiner*—M. Nuzzolillo
*Attorney, Agent, or Firm*—Foley & Lardner

[57] ABSTRACT

A method an apparatus is disclosed for forming a battery terminal having a threaded hard metal insert received within an outer portion formed of softer metal such as lead. A preformed outer portion is deformed by an orbital head forming apparatus to secure the hard metal insert within the outer portion.

20 Claims, 2 Drawing Sheets

5,814,421

METHOD AND APPARATUS FOR MAKING A BATTERY TERMINAL AND A BATTERY TERMINAL MADE THEREBY

FIELD OF THE INVENTION

This invention relates to a method and apparatus for making an electrical battery terminal and more particularly a cold formed battery terminal having a threaded member imbedded therein.

BACKGROUND OF THE INVENTION

Battery terminals for secondary batteries, such as the lead acid batteries normally used in motor vehicles, are usually formed of a lead alloy. The battery terminal, which is typically imbedded in an insulating battery case, provides a connection between the cells within the battery case and an external electrical circuit. While top-mounted battery terminals are usually provided with an upstanding post for engagement by a battery clamp, side mounted battery terminals are instead provided within an internally threaded aperture for receiving a threaded stud, which is used to secure a connector to the battery. The battery terminal, typically made of lead or a lead alloy is formed by a cold forming process.

However, the threads in the aperture of a side mounted battery terminal are not formed in the lead or lead alloy, due to their softness. Threads so formed, would be readily striped when engaged by the threaded stud used to secure a connector to the battery terminal. Thus it has been found desirable to imbed an internally threaded member, formed of a harder metal, in the lead terminal. Typically this harder member is formed of stainless steel, although other metals such as copper, brass, or steel could be utilized. One method for forming such battery terminals is to place an internally threaded hard metal insert in an aperture in a lead member which is then formed around the hard metal insert by dies in a press. When forming a terminal in this way it has been found desirable that the threaded hole in the insert be closed at it base. Should a hole accidentally be formed in the base of the lead terminal when the electrical connection from the battery cells is welded to it, the closed base of the insert will prevent the hole from extending through to the outside of the battery, through which the liquids in the battery might escape. Further, the closed base of the insert will prevent the lead from being forced into the threaded hole.

In manufacturing such terminals, it is of course desirable to maintain or improve the quality of the terminal while at the same time simplifying and reducing the cost of its manufacture.

SUMMARY OF THE INVENTION

It is an object of this invention to provide a method and apparatus for making an improved battery terminal.

In accordance with this invention the outer lead portion of a side mounted battery terminal, that is one having a threaded hole therein for receiving a threaded fastening means, is cold formed. The lead portion of a terminal is formed by placing a lead slug between a pair of dies. The dies, when forced into engagement with each other, cause the lead, by cold flow, to conform to the shape of the cavity formed by the two die parts, thus forming the lead outer component of the terminal.

The outer component of the terminal is formed with a blind hole therein. The portion of the hole adjacent the closed end is formed with a shape which conforms to that of the outer periphery of first portion of a threaded hard metal insert which is received within the blind hole. In the preferred embodiment, the peripheral shape of the first portion of the hard metal insert is hexagonal. However, any shape, other than round, which would serve to prevent the insert from turning within the outer component could be used. A second portion of the hard metal insert is provided with a cylindrical outer surface smaller in diameter than that of a circle to which the sides of the hexagonal portion are tangential.

The outer lead component of the terminal is provided with an upstanding cylindrical portion surrounding the aperture in which the hard metal insert is placed. The upstanding cylindrical portion of the outer lead component of the terminal, with the hard metal insert placed therein, is engaged by an orbital head forming tool. The orbital head forming tool causes the upstanding cylindrical portion to be deformed over the hard metal insert to rigidly secure the outer component to the hard metal insert.

DETAILED DESCRIPTION OF THE PREFERRED EMBODIMENT

Figure 1:
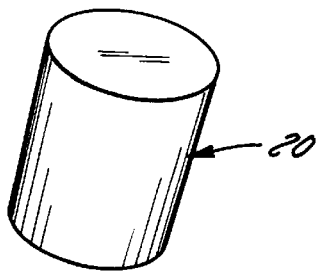
FIG. 1 is a perspective view of a lead or lead alloy slug used to form the lead portion of a battery terminal in accordance with this invention.
Figure 2:
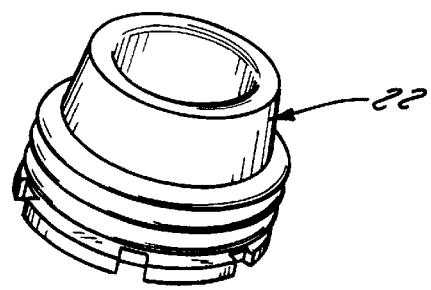
FIG. 2 is a perspective view of the lead outer component for a battery terminal in accordance with this invention, cold formed between a pair of dies, from the slug shown in FIG. 1.

A lead or lead alloy slug 20 such as shown in FIG. 1 is formed into a lead outer component 22 of a battery terminal as shown in FIG. 2. In accordance with the preferred embodiment of this invention, the lead outer component 22 of a battery terminal is cold formed between a pair of dies in a press. An apparatus and method for cold forming a battery terminal is set forth in U.S. Pat. No. 5,422,202, granted Jun. 6, 1995, entitled: Side Wall Electrical Battery Terminal, in U.S. Pat. No. 5,425,170, granted Jun. 20, 1995, also entitled: Side Wall Electrical Battery Terminal, and in copending U.S. patent application Ser. No. 08/459,783, now U.S. Pat. No. 5,589,294, filed Jun. 2, 1995 as a continuation application of the U.S. Patent Application which issue as the above-mentioned U.S. Pat. No. 5,425,170, which patents and application are assigned to the Assignee of the subject application. The teachings of the above-mentioned patents and patent application relating to the cold forming of a battery terminal are hereby incorporated by reference in this application.

The lead outer portion of a battery terminal is cold formed around a nut in the teachings of the above-mentioned patents and patent application. The same method and apparatus set forth in the above-mentioned patents and patent application is used in accordance with this invention. However, a nut is not placed in a cavity in a slug, but rather the upper die is shaped to form a cavity of the desired shape in the outer lead component 22. While the cavity is formed in the upper die in accordance with the above-mentioned patents and patent application, it could also be formed in the lower die.

Figure 3:
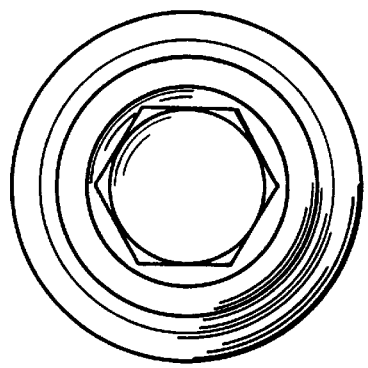
FIG. 3 is a top view of the outer component of the battery terminal shown in FIG. 2.
Figure 4:
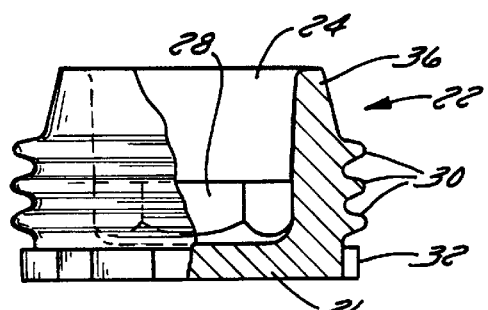
FIG. 4 is a side view, with a portion in cross-section, of the outer component of the battery terminal shown in FIG. 2.
Figure 5:
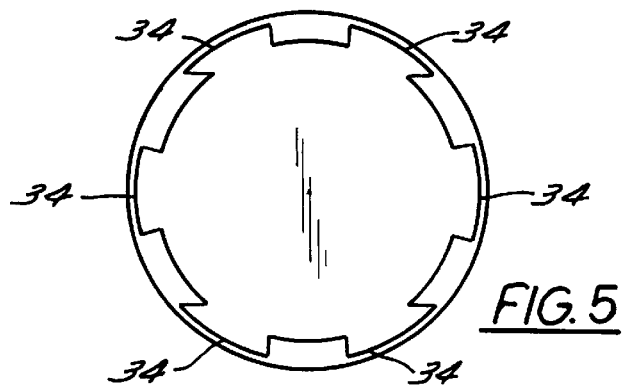
FIG. 5 is a bottom plan view of the outer component of the battery terminal shown in FIG. 2.

Referring to FIGS. 3 through 5, the lead outer component 22 of a terminal constructed in accordance with the method and apparatus of this invention will be further described. The outer component 22 of a terminal is formed with a blind hole or cavity 24 which has a closed end 26. A portion of the cavity adjacent closed end 26 is provided with a hexagonal shape 28.

The outer surface of the outer component 22 is provided with a number of sealing rings 30 and a spline ring 32. The sealing rings 30 are molded into the wall of the battery case, as is the spline ring 32, which is provided to prevent rotation of the terminal within the battery housing. The splines 34 of the spline ring 32 are best shown in FIG. 5.

Figure 6:
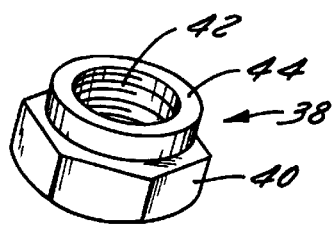
FIG. 6 is a perspective view of a threaded hard metal insert used to form a battery terminal in accordance with this invention.

The outer component 22 is also provided with an upstanding generally cylindrical portion 36, which, as will be subsequently described, is deformed by a orbital head forming tool to secure a threaded hard metal member or insert 38, such as shown in FIG. 6 in the assembled terminal. While the prior method of forming a battery terminal as set forth above, required the threaded hard metal member or insert to be closed at its base, that is not necessary when forming a battery terminal in accordance with this invention. The closed end 26 of the blind hole or cavity 24 in the outer component 22 forms the desirable seal, and the manner in which the outer component 22 is secured to the insert 38 does not act to cause the material of the outer component 22 to enter the threaded hole. Thus, a less expensive through threaded insert can be used, as compared to the prior method which required the threaded hole to be closed at one end.

Figure 7:
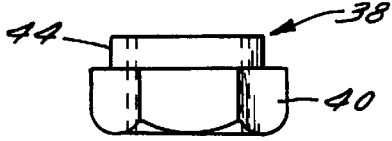
FIG. 7 is a side elevation view of the hard metal insert shown in FIG. 6.

Referring to FIGS. 6 and 7, the hard metal insert 38 is provided with a threaded central bore 42, an enlarged head portion 40 having a hexagonal shape, and a reduced size cylindrical stem portion 44. While the outer component 22 and the hard metal insert 38 are shown with matching hexagonally shaped portions 28 and 42, other shapes, except for cylindrical, could be readily used, wherein the prime purpose of the interlocking shapes is to prevent the rotation of the insert 38 within the outer component 22.

Figure 8:
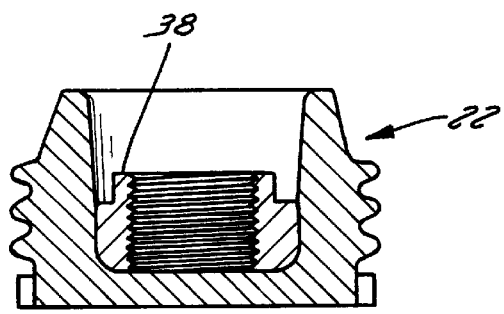
FIG. 8 is a cross-sectional view of the outer component of a battery terminal as shown in FIG. 2 with the hard metal insert shown in FIG. 6 placed therein.
Figure 9:
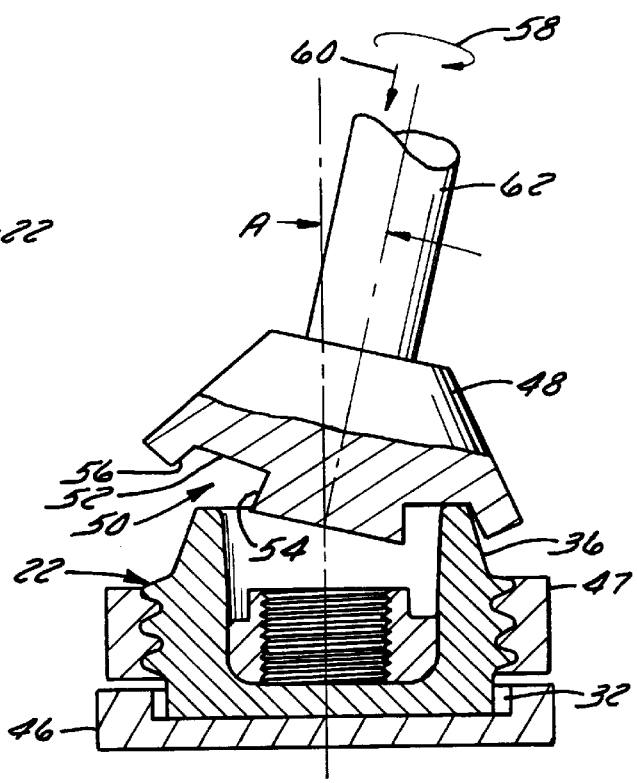
FIG. 9 is a side elevation view, with portions shown in cross-section of an orbital head forming tool beginning to engage the outer component of the battery terminal, with the hard metal insert placed therein as shown in FIG. 8.
Figure 12:
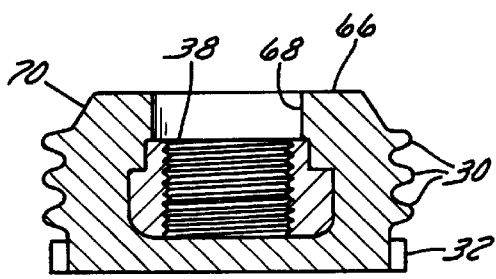
FIG. 12 is a cross-sectional view of a battery terminal formed by the method and apparatus of this invention as shown in FIG. 11.
Figure 10:
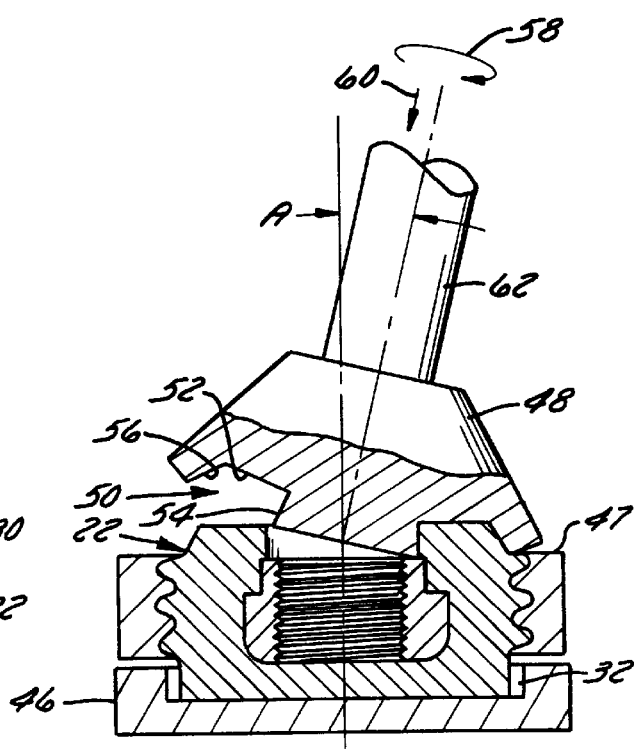
FIG. 10 is a side elevation view, similar to FIG. 9, showing the position of the orbital head forming tool when the forming a battery terminal in accordance with this invention is completed.

Referring now to FIG. 8, the hard metal insert 38 is placed within the outer lead component 22 as shown. The outer component 22 is held in a fixture 46, as shown in FIG. 9. The fixture 46, as shown in FIG. 9, is provided with a cavity shaped to be complimentary to the spline ring 32 of the outer component 22. Thus, the fixture 46 prevents rotation of the outer component 22. Additionally, a second fixture 47, in the form of a collet having an inside surface formed to mate with the sealing rings 32, is used to support the outside surface of the outer component 22 to prevent its deformation during the orbital forming operation. Head 48 of an orbital head forming tool is shown in engagement with the upstanding cylindrical portion 36 of the outer component 22. The working surface 50 of the head 48 of the orbital head forming tool is formed as an annual grove. The groove has a flat base 52, an inner wall 54 perpendicular to the base, and an outer wall 56 which is formed at an obtuse angle to the base. As the head 48 orbits as indicated by the arrow 58 and is pressed against the upstanding cylindrical portion 36 of the outer component 22, as indicated by the arrow 60, the cylindrical portion 36 is formed inwardly and downwardly until it captures and overlays the hard metal insert 38 as shown in FIGS. 10 and 12. The cylindrical portion 36 is formed into the shape of the annular groove in the head 48, as illustrated in FIG. 10.

Figure 11:
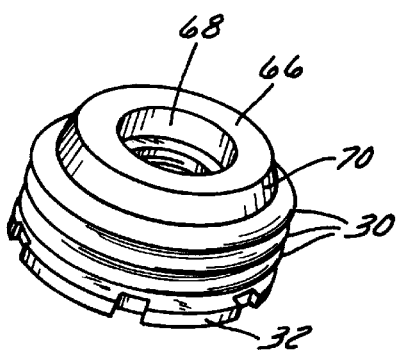
FIG. 11 is a perspective view of a battery terminal as formed by the method and apparatus of this invention.

Shaft 62 supporting head 48 is held at a constant angle "A" with respect to the outer component 22 as it orbits but does not spin with respect to outer component 22. As the shaft 62 follows its orbital path (its long axis being parallel of a wall of an imaginary inverted cone), the working surface 50 of the tool presses on the cylindrical portion 36 on a radial line emanating from the axis of the shaft 62. With all of the pressure applied on this line a flowing wave of material is formed ahead of the portion of working surface 50 engaging the cylindrical portion 36. The material from cylindrical portion 36 has time to flow properly because only a minute quantity is displaced during each revolution and, as friction is minimal, no tearing of the material in cylindrical portion 36 occurs. This results in a clean, polished, non-porous surface on the formed material as shown in FIG. 11. There is no measurable change in molecular structure of the lead or lead alloy such that the portion 64 overlying the hard metal insert 38 is of maximum strength. The portion 64 is defined by a flat annular top surface 66 formed by the flat base 52 of working surface 50, by a cylindrical inner wall 68 formed by the inner wall 54 of working surface 50, and a truncated conical outer wall 70 formed by outer wall 56 of the working surface 50.

While in the preferred embodiment, the lead outer component 22 is cold formed from a lead or lead alloy slug 20, it may also be hot formed by molding. Generally, the cold forming of the outer component 22 is preferred, since a hot formed component is more likely to be formed with voids and surface imperfections.

It should be apparent to those skilled in the art that what has been described is considered at present to be a preferred embodiment of the method and apparatus for forming a battery terminal with a threaded insert, and the battery terminal formed thereby. However, in accordance with the Patent Statutes, changes and modifications may be made in the method and apparatus and the battery terminal formed thereby, without actually departing from the true spirit and scope of this invention. The appended claims are intended to cover all such changes and modifications which fall within the true spirit and scope of this invention.

What is claimed is:

1. A method of manufacturing a battery terminal which includes a metal outer component having a bore therein, the bottom of which bore is closed, and an insert having an internally threaded hole therein, comprising:

A. placing the insert within the bore in the outer component, such that it rests on the closed end of the bore, B. engaging the top edge of the outer component, which extends above the top surface of the insert with the operating head of a orbital head forming tool, C. reforming, with the orbital head forming tool, the portion of the outer component which extends above the insert, such that the portion is formed in secure engagement with and overlaying the top surface of the insert and with a hole therein in alignment with the internally threaded hole in the insert.

2. The method of manufacturing a battery terminal of claim 1, further including forming the metal outer component from a slug of metal by pressing the slug between a pair of dies which when brought together define a cavity having the desired shape of the outer component.

3. The method of manufacturing a battery terminal of claim 2, wherein forming the metal outer component from a slug of metal includes the step of forming a portion of the bore in the metal outer adjacent the bottom with a hexagonal shape.

4. The method of manufacturing a battery terminal of claim 3, wherein forming the metal outer component from a slug of metal includes the step of forming a top portion of the bore in the metal outer distal the bottom with a circular shape.

5. The method of manufacturing a battery terminal of claim 4, wherein forming the metal outer component includes the step of forming the metal outer component from lead.

6. The method of manufacturing a battery terminal of claim 5, wherein forming the metal outer component includes the step of forming a spline ring having a plurality of splines.

7. The method of manufacturing a battery terminal of claim 6, further including engaging the spline ring in a first fixture to prevent rotation of the metal outer component.

8. The method of manufacturing a battery terminal of claim 7, further including engaging an outer surface of the metal outer component proximate a set distance above the spline with a collet to prevent deformation of the outer component.

9. A method of manufacturing a battery terminal having a metal outer component having an insert, the method including:

forming a metal outer component including a bore having a closed bottom;

placing the insert within the bore;

engaging the metal outer component with an orbital head forming tool; and reforming the metal outer component to securely engage a portion of the insert.

10. The method of manufacturing a battery terminal of claim 9, further including forming the metal outer component from a slug of metal by pressing the slug between a pair of dies which when brought together define a cavity having the desired shape of the outer component.

11. The method of manufacturing a battery terminal of claim 10, wherein forming the metal outer component from a slug of metal includes the step of forming a portion of the bore in the metal outer adjacent the bottom with a hexagonal shape.

12. The method of manufacturing a battery terminal of claim 11, wherein forming the metal outer component from a slug of metal includes the step of forming a top portion of the bore in the metal outer distal the bottom with a circular shape.

13. The method of manufacturing a battery terminal of claim 12, wherein forming the metal outer component includes the step of forming the metal outer component from lead.

14. The method of manufacturing a battery terminal of claim 13, wherein forming the metal outer component includes the step of forming a spline ring having a plurality of splines.

15. A method of manufacturing a battery terminal including a metal outer component having an insert, the method including:

placing the insert within a bore of the metal outer component, the metal outer component having an upstanding cylindrical portion;

engaging the upstanding cylindrical portion with an orbital head forming tool; and reforming the upstanding cylindrical portion inwardly and downwardly to securely engage a portion of the insert.

16. The method of manufacturing a battery terminal of claim 15, wherein the orbital head includes a working surface having an annual groove, and wherein engaging the upstanding cylindrical portion with an orbital head forming tool includes engaging the annual groove the upstanding cylindrical portion.

17. The method of manufacturing a battery terminal of claim 15, wherein the orbital head includes a shaft which follows an orbital path during the forming operation.

18. The method of manufacturing a battery terminal of claim 15, wherein the shaft is held at a constant angle with respect to the outer component during the forming operation.

19. The method of manufacturing a battery terminal of claim 18, wherein forming the metal outer component includes revolving the orbital head with respect to the outer component.

20. The method of manufacturing a battery terminal of claim 19, wherein a portion of the outer component is moved during each revolution of the orbital head.

* * * * *